Aug. 31, 1943.                H. F. VICKERS                    2,328,311
                    HYDRAULIC HOISTING AND ROTATING APPARATUS
                              Filed March 7, 1938
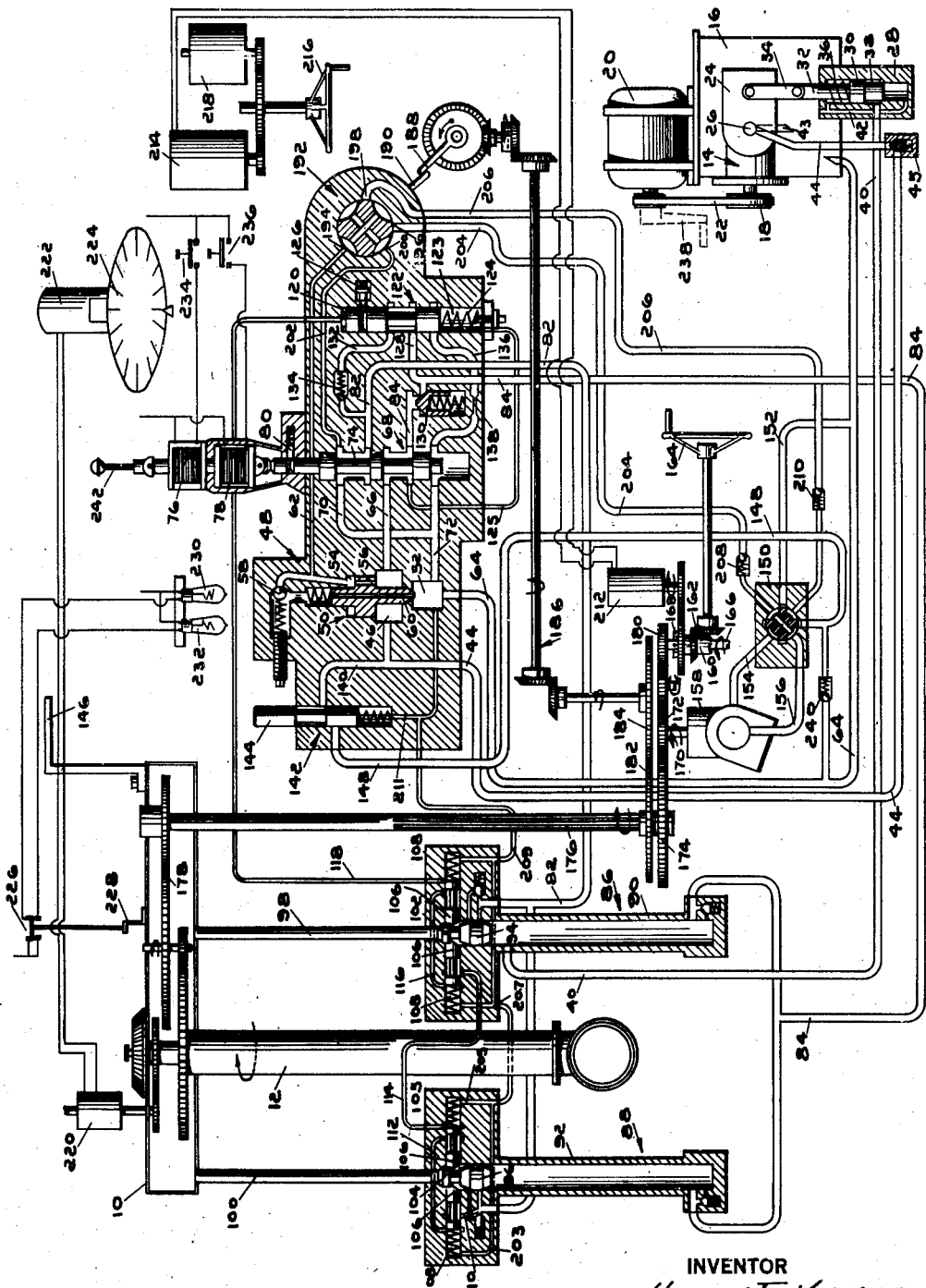
INVENTOR
*Harry F. Vickers*
BY
*Barnes, Kissell, Laughlin & Raisch*
ATTORNEYS Patented Aug. 31, 1943

2,328,311

UNITED STATES PATENT OFFICE 2,328,311

HYDRAULIC HOISTING AND ROTATING APPARATUS

Harry F. Vickers, Detroit, Mich., assignor to Vickers, Incorporated, Detroit, Mich., a corporation of Michigan Application March 7, 1938, Serial No. 194,284

3 Claims. (Cl. 60—52)

This invention relates to power transmissions and more particularly to those of the fluid type wherein a power transmitting fluid, such as oil, and hereinafter referred to as such, is utilized for the transmission of power between one or more pumps and one or more fluid motors.

It is an object of the present invention to provide a power transmission system for operating a translatable and rotatable load device, and which may be constructed as a compact unitary power device providing for smooth, yet rapid, translatory movement of the load device under manual control and which also provides for accurate follow-up operation of the load device to any angular position desired.

A further object is to provide a system of this character in which the rotation of the load device can be effected only when the load device has been translated to one certain position and to provide reliable, safe, and trouble-proof interlocking means for insuring this result.

A further feature of the invention resides in the provision of novel limit stop means for preventing continued rotation of the load device beyond a predetermined point by disabling the hydraulic drive mechanism and which does not, however, prevent operation of the drive mechanism in the reverse direction to back the load device away from its stop.

A further object is to provide positive and reliable latch means for releasably restraining the load device in one position of its translatory movement together with safety interlocking means for releasing the latch means and preventing translation of load device until the latch means is fully released.

Further objects have to do with detailed constructional features and coordinated operation of parts as more fully set forth in the specification and claims.

The single figure is a diagrammatic view of a hydraulic system embodying a preferred form of the present invention.

The embodiment of the invention selected for illustration is suitable for operating a vertically translatable head 10 in such a manner that the head may be either retained in its upper and inoperative position, as illustrated, or may be moved downwardly in its lowermost position. In this latter position a rotatable member 12, which is carried by the head 10, may be rotated to any desired angular position by means of suitable follow-up control mechanism.

The power transmission system for accomplishing these movements comprises a pump 14, preferably of the variable displacement type which is mounted in an oil reservoir 16 and has a drive shaft 18 driven from an electric motor 20 by suitable drive means, such as the belt 22. The displacement of the pump 14 may be varied by means of a swinging yoke 24 pivoted at 26. In the position shown, the displacement of the pump is zero while, if the yoke 24 be swung downwardly, the displacement of the pump is increased in proportion to the amount by which the yoke is swung.

Suitable regulating means such as the cylinder 28 are provided for controlling the position of the yoke 24. The cylinder 28 contains a freely slidable piston 30, the stem 32 of which is connected by a link 34 to the yoke 24. A spring 36 normally biases the piston 30 to its lowermost position, that is, the position of maximum displacement. For the purpose of reducing the pump displacement as may be required to maintain a constant delivery pressure at the pump, the annular chamber 38 of the cylinder 28 connects with a conduit 40 which is connected in the circuit as will be described hereafter. The extreme ends of the cylinder 28 are connected to the tank by a conduit 42.

The pump 14 withdraws oil from the tank through a conduit 43 and delivers oil through a delivery conduit 44, having a check valve 45 for preventing return flow to the pump. The conduit 44 extends to a chamber 46 formed in a control block 48. The chamber 46 constitutes the main pressure chamber of a pilot operated balanced relief valve 50 which is of the same general construction as the valve disclosed in my Patent No. 2,043,453 of June 9, 1936, and is adapted to by-pass oil to a chamber 52 whenever the oil in the control chamber 54 is vented to tank at a faster rate than it can enter the chamber 54 through the restricted orifice 56. A pilot relief valve 58 serves to thus vent the chamber 54 to the chamber 52 through the central bore 60 whenever the pressure in chamber 54 exceeds a predetermined safe value. A branch conduit 62 also communicates with the chamber 54 for the purpose of venting the same under certain conditions, to be later described.

The chamber 52 connects by a conduit 64 with the tank 16. A conduit 66 in the valve block 58 communicates between the pressure chamber 46 and the pressure port of a four-way reverse valve 68, the tank ports of which are connected by conduits 70 and 72 to the chamber 52. The spool 74 of the valve 68 may be moved between the position shown and a lower position by means of solenoids 76 and 78, suitable detent means 80 being provided for releasably restraining valve in either position without requiring continued energization of either solenoid. The cylinder ports of the valve 68 connect by conduits 82 and 84 with the rod and head ends of a pair of reciprocating fluid motors 86 and 88.

These motors may comprise a pair of stationary cylinders 90 and 92 in which are freely slidable a pair of differential pistons 94 and 96, having rods 98 and 100, upon which the head 10 is supported and secured. The conduit 40 connects to the cylinder 90 at a point just below the piston 94 in its uppermost position. The pistons 94 and 96 are formed with tapered ends, as illustrated, and the conduits leading to the ends of the cylinders are provided with check valve controlled, restricted branches, as shown, for providing a hydraulically cushioned deceleration of the pistons at either end of the stroke in the well-known manner. The rods 98 and 100 are provided with collar-like portions 102 and 104 which may be engaged by a plurality of latch means, four of which are illustrated.

The latch means may comprise cylindrical plungers 106, having their inner ends beveled, as shown, and normally biased inwardly by springs 108. Each of the plungers 106 is formed to act as a three-way valve which connects with the spring chambers when the latches are in their inward position, illustrated. When the latches are retracted outwardly, these valves are connected in a series circuit starting at the conduit 110 which is in communication with the conduit 82 at all times. A series of conduits 112, 114, 116 and 118 completes this series circuit and terminates at the operating chamber 120 of a pilot operated three-way valve 122.

The valve 122 has an operating chamber 123 at its lower end containing a spring 124. The chamber 123 connects by a conduit 125 to the lower cylinder port of valve 68. The valve 122 may be provided with suitable spring detent means 126. A conduit 128 connects to the conduit 84 at a point beyond a check valve 130 and is adapted to be selectively connected by the valve 122 with either, a conduit 132 having a check valve 134 therein and communicating with the conduit 82, or a conduit 136 communicating with the lower tank port of the four-way valve 68. The conduit 136 may have a restricted portion 138 therein.

Communicating with the conduit 44 is a branch conduit 140 which connects to a two-way valve 142. The latter has an upwardly projecting stem 144 which may be depressed by an arm 146, carried by the head 10 when the latter descends to its lowermost position. When the valve plunger 144 is depressed, communication is established from conduit 140 to a conduit 148, leading to the pressure port of a rotary follow-up valve 150. The valve 150, which is indicated only diagrammatically in the drawing, may be of any suitable construction whereby pressure and tank connections may be selectively reversed or shut off in accordance with the difference in angular position between a rotary input member and a rotary follow-back or response member. One example of a valve of this character is illustrated in my Patent No. 2,030,902 of February 18, 1936. The tank port of the valve 150 may be connected to tank by a conduit 152 while the controlled ports are connected by conduits 154 and 156 with a rotary fluid motor 158. The latter may be of similar construction to the pump 24, except that the yoke of the motor is maintained at a fixed, though preferably adjustable, angle, at all times.

The rotary input element of the valve 150 may be connected by means, not illustrated, with a sleeve 160 which is connected by bevel gearing 162 to a handwheel 164. The follow back or response element of the valve 150 may be connected with a shaft 166, on which the sleeve 160 is rotatably mounted. Preferably stop means 168 for limiting the relative angular displacement between sleeve 160 and shaft 166 are provided to prevent displacement of the two rotary valve controlling elements beyond the amount necessary to fully open the valve in either direction. This means may be made sufficiently strong so as to provide a mechanical drive from the handwheel 164 to the shaft 166, should the motor 158 for any reason fail to respond to the operation of the follow-up valve 150.

The motor 158 has an output shaft 170 connected by a gear 172 with a gear 174 mounted for rotation in a fixed bearing, not illustrated. The gear 174 has an internally splined hub in which a splined shaft 176 may be slidably but non-rotatably mounted. The shaft 176 is rotatably mounted in the head 10 and connects by gearing 178 to the rotatable member 12. The gear 172 at the motor 158 also connects by gearing 180 with the response shaft 166.

For the purpose of limiting the angular rotation of the rotary member 12, the gear 174 carries a gear 182 meshing with a gear 184 which connects by bevel gearing and shafting 186 to a rotatable limit stop arm 188, mounted for rotation adjacent the valve block 48. The gear ratios are such that one revolution of the member 188 corresponds to the desired range of angular rotation of the member 12. The member 188 is adapted to contact a lever 190 which is connected to operate a rotary pilot valve 192 which is normally spring centered in the position illustrated, but which may be deflected clockwise or counterclockwise by operation of the lever 188. The valve 192 has one port 194 connected to the conduit 62. Ports 196 and 198 are adapted to be selectively connected with the port 194 by clockwise and counter-clockwise rotation respectively of the valve 192. Port 200 is connected to the tank port of valve 68 by a conduit 202 and serves merely to drain any seepage of fluid from the valve 192. The ports 196 and 198 connect by conduits 204 and 206 to the controlled ports of follow-up valve 150, suitable check valves 208 and 210 being provided in these conduits.

Suitable drain conduits 203, 205, 207, 209 connect the spring chambers behind the latch plungers 106 with the tank chamber 52 in block 48. A branch 211 also connects to the lower end of valve 142.

The input sleeve 160 for the follow-up valve may be remotely operated by a suitable "Selsyn" transmission system comprising the motor 212 geared to the sleeve 160 and the generator 214 geared to the remote handwheel 216. A flywheel 218 may be provided at the handwheel 216 to limit the acceleration which may be imparted thereto. Preferably a bearing repeater is also provided at the remote control station, comprising a "Selsyn" generator 220 geared to the rotary member 12 and a "Selsyn" motor 222 operating a suitable indicating dial 224. Signalling means for indicating whether the head is in its hoisted or lowered position are provided which consist of a double throw switch 226, normally spring biased downwardly and adapted to be moved upwardly by a stop 228 carried by the head 10. Switch 226 energizes a light signal 230 when head 10 is up and a light signal 232 when the head 10 is down. The solenoids 76 and 78 may be controlled by suitable momentary contact push button switches 234 and 236.

For the purpose of permitting operation of the device in case of failure of electric power, a hand crank 238 may be applied to the motor shaft for operating the pump 14 manually to raise and lower the head 10. The member 12 may be rotated under these conditions by the hand crank 164 in which case a check valve 240 by-passes oil from the line 64 to the line 148 when the motor is operated in either direction and acts to pump fluid into the line 152. In case of power failure the valve spool 74 may be operated manually by the handle 242.

In operation, starting with the parts in the position shown in the drawing and with the motor 20 driving the pump 14, it will be seen that so long as the valve 68 remains in its upper or hoisting position, fluid will be delivered by the pump 14 through the conduit 44, check valve 45, chamber 46, conduit 66, valve 68, conduit 84 and check valve 130 to the lower ends of cylinders 90 and 92. With the pistons 94 and 96 at the upper limit of their strokes, pressure will build up in cylinder 90 and being transmitted through conduit 40 to the annular chamber 38 will move the piston 30 upwardly to approximately the position shown where the displacement of the pump is just sufficient to make up for the total leakage in the high pressure side of the system.

When it is desired to lower the head 10 and rotating member 12, the switch 234 may be depressed energizing solenoid 76 to shift the spool 74 downwardly, connecting conduit 66 with conduit 82 and connecting conduit 84 to tank. Under these conditions pressure oil passes through conduit 82 and through the cushioning check valves to the head ends of the cylinders 90 and 92. This pressure is exerted on the inner face of the latch plungers 106 and is sufficient to overcome the springs 108, withdrawing the latches from engagement with the collars 102 and 104. Before the latches move outward, pressure is supplied from conduit 82 through check valve 134, conduit 132, valve 122 and conduits 128 and 84 to the lower ends of the motor cylinders. Due to the differential area of the pistons the net fluid force exerted thereon is in the upward direction, tending to relieve the gravity load on the latches 106 and thus making their outward movement free from frictional drag caused by the weight of the head 10 and associated parts.

As soon as all of the latches 106 have moved outwardly, pressure oil is transmitted through the series circuit at the latch valves through conduits 110, 112, 114, 116 and 118 to the upper operating chamber 120 of the valve 122. The latter shifts downwardly discharging oil from the lower chamber 124 through conduit 125 to the tank. With the valve 122 in its lower position, conduit 132 is cut off from conduit 128 and the latter is connected to tank through conduit 136, restrictor 138, valve 68, conduit 72, chamber 52 and conduit 64. The pistons 94 and 96 accordingly descend due to the combined weight of the head 10, and the fluid pressure on top of the pistons, the rate of descent being slowed down somewhat by the restrictor 138.

It will be noted that as soon as the valve 122 shifts and the pressure in the head ends of the motor cylinders falls that the pipe 40 is no longer subject to high pressure and the piston 30 accordingly moves downwardly bringing the pump into full displacement position. As soon as the piston 94 passes the conduit 40 the latter is again connected to the discharge side of the pump and the pump regulates itself to maintain a constant delivery pressure. As the pistons 94 and 96 approach the end of their stroke they are decelerated by the cushioning chambers, pressure remaining on top of the pistons to hold the head 10 in its downward position. With the pistons thus stalled at the bottom of the cylinders, the pump displacement regulator again swings the yoke 24 to approximately neutral position.

As the head 10 reaches the bottom of its stroke, arm 146 depresses plunger 144 of valve 142 thus connecting conduit 148 to the delivery conduit 44 of the pump. The system is now ready for operation of the rotating element 12 under the control of the follow-up valve 150. Thus, if the handwheel 216 be rotated to any new position this motion is transmitted through the Selsyn system 212—214 to the sleeve 160, which controls the input member of the follow-up valve 150. The relative displacement between the input member and the response member thus produced, opens the valve 150 to flow of oil from conduit 148 to whichever of the conduits 154 or 156 will cause rotation of the motor 158 in a corresponding direction. The discharge from the motor returns from the follow-up valve 150 through conduits 152 and 64 to the tank. The unit 12 may thus be rotated to any desired position, at will, by operation of the handwheel 216. The bearing repeater 224 of course indicates all movements of the member 12.

If the member 12 be rotated too far in a given direction, the limit stop arm 188 is caused to abut the pilot valve lever 190 and opens communication between port 194 and either port 196 or 198, depending upon the direction in which the arm 188 approaches the lever 190. Assume, for example, that the handwheel 216 is turned in the direction causing the follow valve 150 to admit pressure oil to the conduit 154 and thus causing the shaft 170 to rotate in the direction of the arrow. The direction of rotation of the other shafts will be as indicated by the arrows, thus moving the lever 190 clockwise and connecting port 194 to port 196. The control chamber 54 of the relief valve 50 is thus vented to tank through conduit 62, port 194, valve 192, port 196, conduit 204, check valve 208, follow-up valve 150 and conduits 152 and 64. Oil discharged by the pump is thus by-passed at the valve 50 from chamber 46 to chamber 52 and through conduit 64 to the tank, thus preventing further operation of the motor 158 in that direction.

If now the handwheel 216 be turned in the opposite direction so as to move the follow-up valve to connect conduit 156 to the pressure conduit 148, it will be seen that pressure will be immediately transmitted to the conduit 204 and will back up against the check valve 208 thus preventing further venting of the oil from chamber 54 of the relief valve and permitting the latter to close. Thus motor 158 may be backed away from its limiting position.

Upon continued rotation to the other limit determined by the arm 188, the operation is similar to that described except that all shafts turn in the direction opposite to the arrows and the relief valve is vented through conduit 206, instead of conduit 204. Here again, as soon as the follow-up valve operates to back up from the limiting position, pressure builds up behind the check valve 210 and the relief valve is no longer vented.

When it is desired to raise the head 12, switch 236 is closed, energizing solenoid 78 and lifting the valve spool 74 again to the position shown in the drawing. The rod ends of the cylinders 90 and 92 are now connected to tank through conduit 82, conduits 70, 72 and 64. Pressure oil from the chamber 46 is admitted to the conduit 125 and chamber 124 to shift the valve 122 upwardly, discharging oil from the chamber 120 through conduit 118, the three-way valve at the right hand latch plunger 106 and the drain conduit 209 to tank. It will be noted that due to the tank pressure existing in the upper ends of cylinders 90 and 92, that the springs 108 move all the latch plungers 106 inwardly. Pressure oil is also delivered from the conduit 66 through conduit 84 and check valve 130 to the lower ends of the cylinders 90 and 92, thus moving the pistons and the head 10 upwardly until the position, shown in the drawing, is reached. The latch plungers 106 then engage the collars 102 and 104 and since the piston 94 is now above the conduit 40, the pump 24 is again regulated to its small displacement position sufficient to maintain the desired pressure beneath the pistons 94 and 96.

If for any reason the supply of electric power should be interrupted, the pump 14 may be operated by the hand crank 238 to lower the head 10 in a similar manner to that previously described. The valve spool 74 may be operated manually by the handle 242 for this purpose. When the head 10 has descended check valve 45 prevents upward movement thereof, this valve also serving to prevent falling of the head 10 while it is being hoisted by the operation of the hand crank 238. When the head is in its lowered position the same may be rotated manually by the operation of the handwheel 164 which by means of the stop mechanism 168 provides a direct mechanical drive to the rotatable member 12. The motor 158 is, of course, mechanically driven during such operation and oil discharged into the tank conduit 152 may return to the opposite side of the motor 158, through conduit 64 and check valve 240. The flow is always in the same direction regardless of the direction of operation of hand wheel 164 since the follow up valve 150 reverses connections to the motor 158 each time the hand wheel is reversed.

What is claimed is as follows:

1. In a fluid power transmission system the combination with a pump forming a source of fluid under pressure, of a reciprocating fluid motor operable on fluid supplied from said source, valve means for selectively controlling the supply of fluid to said motor, pressure responsive means for regulating the displacement of the pump said means being normally biased to effect a predetermined pump displacement, and means including the motor piston operable during each stroke of the motor to control the connection between said pump regulating means and the motor for causing connection of said pump regulating means to the inactive side of the motor during the first portion of the stroke and connection to the active side during the final portion of each stroke, said piston alone being the direct controlling means for such connection.

2. In a hydraulic system, a variable delivery pump, a movable head on said pump to control delivery thereof, a reciprocating fluid motor comprising a piston and cylinder, a translatable load device continuously biasing the motor in one direction, a pressure responsive member operably connected to said movable head and movable to regulate the displacement of said pump, said member being normally biased to effect a predetermined pump displacement, and conduit means connecting said pressure responsive member to said cylinder at a point between the limits of the stroke of said piston so pressure is maintained in said cylinder to replace leakage when said load is shifted and held against its bias and constant pressure is maintained in said cylinder when said load is shifted in the direction of its bias.

3. In a hydraulic system, a variable delivery pump, a movable head on said pump to control delivery thereof, a reciprocating fluid motor comprising a vertical cylinder and piston therein, a load acting downward on said piston, a pressure responsive member operably connected to said movable head and movable to regulate the displacement of said pump, said member being normally biased away from a neutral position to effect a predetermined pump displacement, and conduit means connecting said pressure responsive member to said cylinder at a point adjacent but spaced from the top thereof a distance slightly greater than the axial length of said piston so pressure in said cylinder reacts on said pressure responsive member to actuate the same towards neutral whereby when said piston is in up position, said pump will be reduced in displacement to maintain leakage and when said piston is descending below the conduit cylinder opening, substantially constant pressure will be maintained to urge the piston downwardly.

HARRY F. VICKERS.